SYNCHRONOUS COMMUNICATION SYSTEM

Filed Nov. 26, 1962 2 Sheets-Sheet 1

INVENTORS
SAMUEL L. BROADHEAD JR.
JOHN F. McINERNEY
BY
ATTORNEY

INVENTORS
SAMUEL L. BROADHEAD JR.
JOHN F. McINERNEY
BY Max Moody
ATTORNEY

United States Patent Office 3,217,255
Patented Nov. 9, 1965

3,217,255
SYNCHRONOUS COMMUNICATION SYSTEM

Samuel L. Broadhead, Jr., and John F. McInerney, Cedar Rapids, Iowa, assignors to Collins Radio Company, Cedar Rapids, Iowa, a corporation of Iowa Filed Nov. 26, 1962, Ser. No. 240,071
6 Claims. (Cl. 325—64)

This invention relates in general to a communication system, and in particular to an automatic frequency control system which is capable of correcting for frequency drift including Doppler frequency shifts caused by relative velocity between the transmitting and receiving sites.

When communication stations are moving at a high velocity relative to each other, the Doppler shift caused by such movement can be sufficient to detune the receivers and poor communications can result. It is an object to this invention to provide an automatic frequency control system which will compensate for Doppler frequency shifts so that good communication will result. The system will, of course, also correct frequency drifts caused by other factors such as temperature changes, etc.

A feature of this invention is found in the provision for a transmitter which transmits a high-energy carrier signal for a short time. The carrier is used in a broad-band automatic frequency control loop in the receiver to tune the injection oscillator of the receiver. The transmission of intelligence occurs after this short initial time and the receiver is switched from the broad-band automatic frequency control loop to a narrow-band automatic frequency control loop. Since the broad-band automatic frequency control loop has brought the receiver near the correct frequency for reception, the narrow-band frequency loop is capable of locking on the receiving frequency and maintaining the proper injection with a modulated signal.

Further features, objectives and advantages of this invention will become apparent from the following description and claims when read in view of the drawings in which:

In this invention when transmission of intelligence is required, a carrier signal is transmitted by the transmitter at a high-energy level before modulation occurs. The time of this transmission might be a few milliseconds which does not interfere with the transmission of intelligence duty cycle. The high-level carrier is received by a distant receiver and fed through a wide-band automatic frequency control loop to correct the injection frequency at the receiver. After the short initial transmission of carrier, transmission of intelligence occurs and the receiver is switched to a narrower band frequency shifts loop to continue frequency lock with the received modulated signal. This system corrects for frequency shifts from any cause, and in particular from Doppler shifts resulting from relative movement between the two stations.

Figure 1:
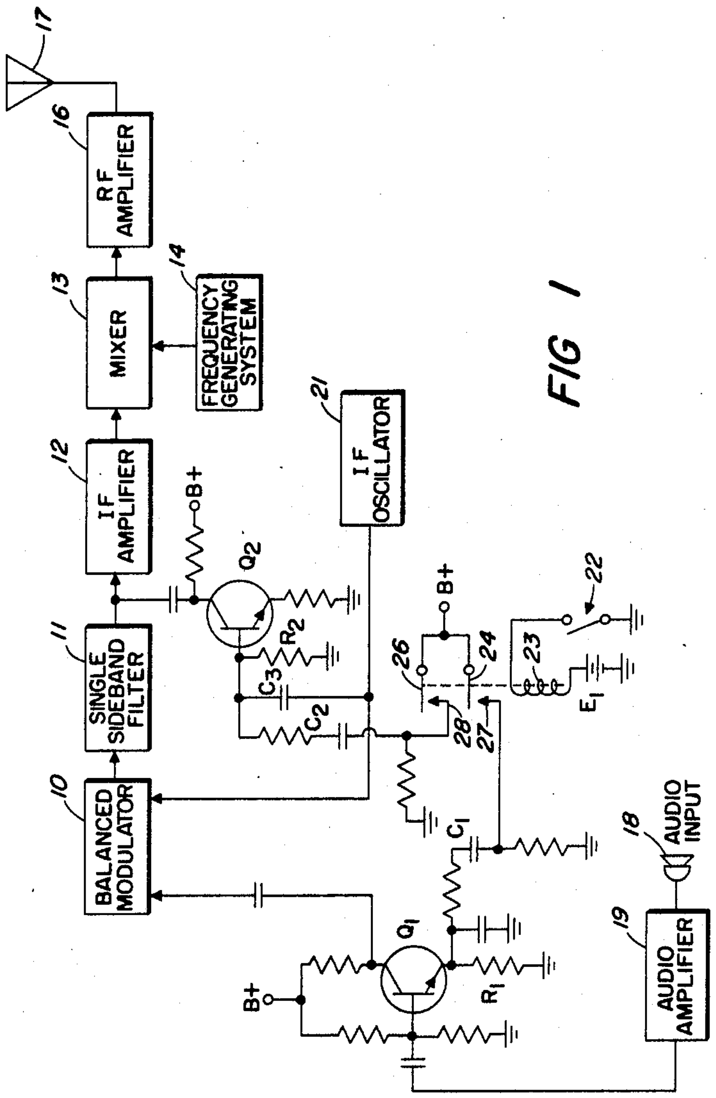
FIGURE 1 is a partial block diagram of a transmitter in accordance with this invention.
Figure 2:
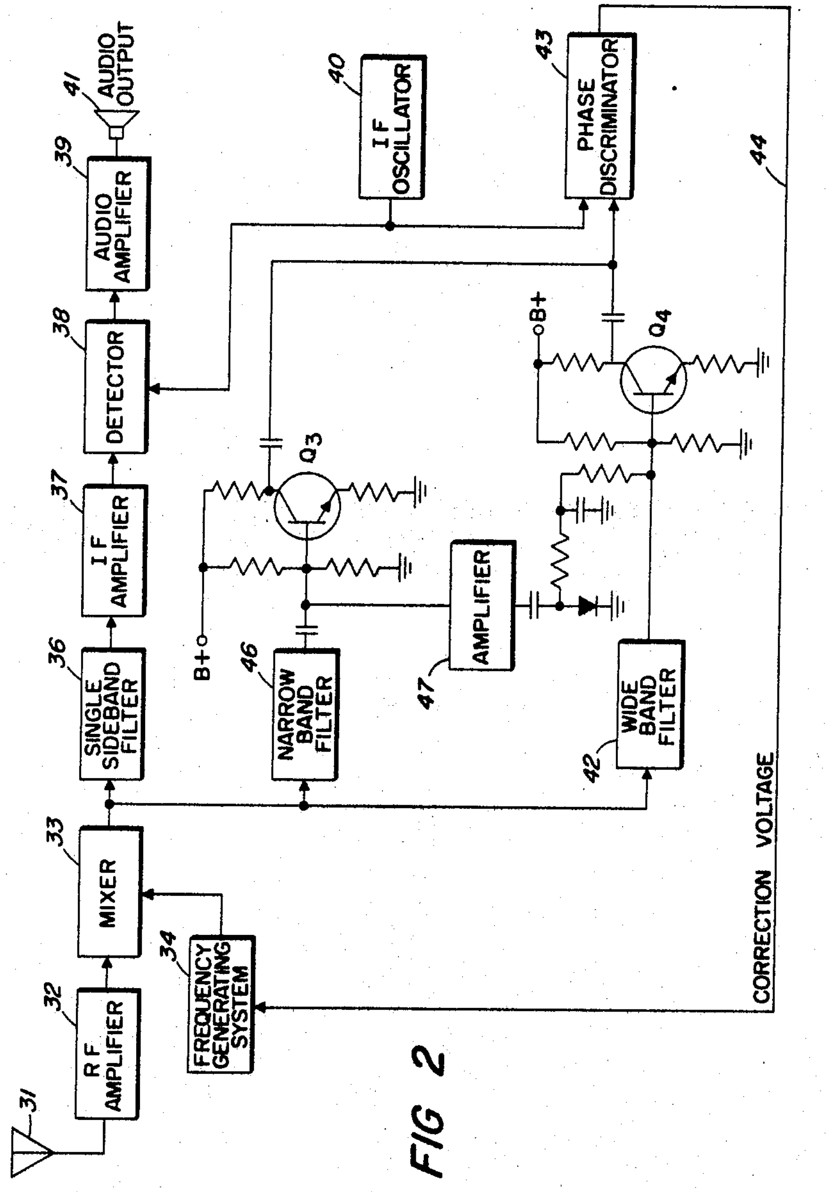
FIGURE 2 is a partial block diagram of a receiver in accordance with this invention.

A preferred embodiment of the invention comprises a transmitter such as shown in FIGURE 1 and a receiver as shown in FIGURE 2. The transmitter comprises a balanced modulator 10 which produces a single sideband signal and supplies it to a single sideband filter 11 which might be tuned to the upper or lower sideband. An intermediate frequency amplifier 12 receives the output of the single sideband filter 11 and passes it to a mixer 13. Mixer 13 also receives an input from the radio frequency generating system 14 to convert the single sideband intelligence signal to the desired frequency for transmission.

Radio frequency amplifier 16 receives the output of mixer 13 and supplies its output to antenna 17.

An intelligence signal, which might be for example voice communication, is fed to a microphone 18 which is in turn connected to an audio amplifier 19. The audio amplifier 19 is connected to the balance modulator 10 through a transistor switch $Q_1$. Transistor switch $Q_1$ has a resistor $R_1$ and a condenser $C_1$ connected between its emitter and ground. An intermediate frequency oscillator 21 is connected to the balance modulator 10. The intermediate frequency oscillator 21 is also connected to a gating transistor $Q_2$ which has its output connected to the input of intermediate frequency amplifier 12. A resistor $R_2$ and a condenser $C_2$ are connected in the base circuit of the gating transistor $Q_2$. A push-to-talk switch 22 has one side connected to ground and the other side to an energizing coil 23 of a relay. The other side of the energizing coil 23 is connected to a battery $E_1$ which has its opposite side connected to ground. The relay 23 controls a pair of movable switches 24 and 26 which are connected to a suitable biasing voltage B+. The stationary contact 27 which engages the movable contact 24 is connected to one side of the condenser $C_1$. Stationary contact 28 which is engageable with movable contact 26 is connected to condenser $C_2$.

In operation when the transmitter is to be used, the push-to-talk switch 22 is closed which closes the relay 23 and switches 24 and 26. Since B+ voltage is connected to movable contacts 24 and 26, the transistor $Q_1$ will be biased to cut off and the transistor $Q_2$ will be biased to conduction. The transistor $Q_1$ will be biased to cut off for only a short time, determined by the time constant $R_1C_1$. The transistor $Q_2$ will be biased to conduction for the same time that the transistor $Q_1$ is biased to cut off as determined by the time constant $R_2C_2$. The output of the IF oscillator 21 will be coupled through the condenser $C_3$ and transistor $Q_2$ to the IF amplifier 12 and will be mixed with the output frequency generating system 14, and will be supplied to the antenna 17 and radiated. Thus, the unmodulated carrier will be radiated at a high-energy level. After a few milliseconds, transistor $Q_2$ will be biased to cut off, and transistor $Q_1$ will be biased to conduction and an audio signal will pass through transistor $Q_1$ to balanced modulator 10, and the output of the IF oscillator 21 will pass to the balance modulator 10. The single sideband signal will then be radiated. Thus, initially when the push-to-talk switch is closed, a high-level carrier signal will be radiated from the antenna for a few milliseconds, then the switch $Q_2$ closes and a single sideband signal will be transmitted.

The receiver of this invention is shown in FIGURE 2 and comprises an antenna 31 which is connected to a radio frequency amplifier 32 which in turn supplies an input to a mixer 33. A frequency generating system 34 supplies a local heterodyning signal to the mixer 33. A single sideband filter 36 receives the output of the mixer 33, and passes it to an intermediate frequency amplifier 37 which in turn supplies the signal to a detector 38. Audio amplifier 39 receives the output of the detector 38 and supplies it to a suitable loudspeaker 41. The detector 38 also receives an input from an intermediate frequency oscillator 40.

The output of mixer 33 is also supplied to a wide-band filter 42 which is coupled to the base of a transistor $Q_4$. The output of transistor $Q_4$ is fed to a phase discriminator 43 which also receives an input from IF oscillator 40. The output of phase discriminator 43 is fed by lead 44 to the frequency control system of the frequency generating system 34. A narrow-band filter 46 also receives the output of mixer 33 and supplies its output to the base of a transistor $Q_3$. The output of the transistor $Q_3$ is coupled to the phase discriminator 43.

In operation assume that the output of the mixer 33 is out of the pass band of the narrow-band filter, but within the pass band of wide-band filter 42. If the receiver has been tuned to the transmitter's known frequency, this will always occur. The wide-band filter will pass the incoming signal through the transistor $Q_4$ and to the phase discriminator 43. Phase discriminator 43 will produce an output which is dependent upon the frequency difference between the signal from wide-band filter 42 and the signal from the oscillator 40. This signal will be fed to the frequency correcting mechanism in the frequency generating system 34; which will change its output until the output of the mixer 33 falls within the pass band of narrow-band filter 46. When this occurs, the signal will pass through the narrow-band filter 46 and transistor $Q_3$ to the phase discriminator 43. A signal present at the output of narrow-band filter 46 will also be fed through the amplifier 47 to the base of the transistor $Q_4$ to cut it off.

Thus, initially an incoming signal if substantially off frequency will pass through the wide-band filter 42 and the phase discriminator 43 will produce a correcting voltage so as to correct the injection frequency originating in the frequency generating system 34. As the output of the mixer 33 approaches the correct frequency, its output will pass through the narrow-band filter 46 and transistor $Q_3$ to the phase discriminator 43. Simultaneously, the transistor $Q_4$ will be cut off due to the passage of the output from narrow-band filter 46 to the amplifier 47. The speed of the correcting system is such that frequency lock occurs during the few milliseconds when the carrier only is being transmitted. However, the system stays tuned after the modulation signal is received in that such signal falls within the pass band of the narrow-band filter.

Thus, there has been provided an automatic frequency control system which will frequency lock a receiver to the correct transmitted signal even though frequency shifts caused by Doppler or other effects are present.

Although it has been changed with respect to preferred embodiments thereof, it is not to be so limited, as changes and modifications may be made therein which are within the full intended scope of the invention as defined by the appended claims.

We claim:

1. In a communication system, a receiver comprising a means for detecting radiant energy, a mixer receiving the output of the detecting means, a frequency generating system supplying an input to the mixer, a wide-band filter receiving the output of the mixer, an initially closed switch connected to the output of the wide-band filter, a phase discriminator connected to the output of the initially closed switch, an oscillator supplying an input to the phase discriminator, the output of the discriminator connected to the frequency generating system to control its frequency, a narrow-band filter connected to the output of the mixer, a second switch connected to the output of the narrow-band filter, the output of the switch connected to the phase discriminator, and the output of the narrow-band filter connected to the initially closed switch to open it when a signal passes through the narrow-band filter.

2. In apparatus according to claim 1 wherein said initially closed and second switches are transistors.

3. An automatic frequency control system for a communication system comprising a transmitter which has a radiating means, a modulating system connected to the radiating means, an IF oscillator connected to the modulating means, a first switch connected between the radiating means and the IF oscillator, a push-to-talk switch connected to the first switch, means to energize said push-to-talk switch, said first switch closed for a short time after the push-to-talk switch is energized to allow the output of the IF oscillator to pass directly to the radiaing means, and a time delay circuit forming a part of the said first switch to allow the first switch to remain closed for a short time after the push-to-talk switch is energized.

4. A frequency stabilizing system comprising a transmitter having a radiating means, a modulating means connected to the radiating means, an IF oscillator connected to the modulating means, a first switch connected between the radiating means and the IF oscillator, a push-to-talk switch, means to energize said push-to-talk switch, said push-to-talk switch being connected to the first switch to close the first switch when the push-to-talk switch is energized, a time delay circuit forming a part of the first switch to open the first switch shortly after the push-to-talk switch is energized, and a modulating source connected to the modulator.

5. A frequency stabilizing system comprising a transmitter having a radiating means, a modulating means connected to the radiating means, an IF oscillator connected to the modulating means, a first switch connected between the radiating means and the IF oscillator, a push-to-talk switch connected to the first switch, means to energize said push-to-talk switch, said first switch being closed when the push-to-talk switch is energized, a time delay circuit forming a part of the first switch to open the first switch shortly after the push-to-talk switch is energized, a modulating source, a third switch connected between the modulating source and the modulator, said third switch energized by the push-to-talk switch to close the third switch shortly after the push-to-talk switch has been energized.

6. A frequency stabilizing system comprising a transmitter having a radiating means, a modulating means connected to the radiating means, an IF oscillator connected to the modulating means, a first switch connected between the radiating means and the IF oscillator, a push-to-talk switch connected to the first switch, means to energize said push-to-talk switch, said first switch being closed when the push-to-talk switch is energized, a time delay circuit forming a part of the first switch to open the first switch shortly after the push-to-talk switch is energized, a modulating source, a third switch connected between the modulating source and the modulator, said third switch energized by the push-to-talk switch to close the third switch shortly after the push-to-talk switch has been energized, a receiver comprising a means for detecting radiant energy, a mixer receiving the output of the detecting means, a frequency generating system supplying an input to the mixer, a wide-band filter receiving the output of the mixer, an initially closed fourth switch connected to the output of the wide-band filter, a phase discriminator connected to the output of the fourth switch, an oscillator supplying an input to the phase discriminator, the output of the discriminator connected to the frequency generating system to control its frequency, a narrow-band filter connected to the output of the mixer, a fifth switch connected to the output of the narrow-band filter, the output of the fifth switch connected to the phase discriminator, and the output of the narrow-band filter connected to the fourth switch to open it when a signal passes through the narrow-band filter.

References Cited by the Examiner

UNITED STATES PATENTS

| | | | |
|---|---|---|---|
| 2,243,719 | 5/41 | Peterson | 325—144 |
| 2,932,733 | 4/60 | Paulson | 325—155 |
| 3,020,352 | 2/62 | De Jager et al. | 325—64 XR |

DAVID G. REDINBAUGH, *Primary Examiner.*